C. H. HAMILTON.
PNEUMATIC TIRE.
APPLICATION FILED DEC. 9, 1920.
1,419,045.
Patented June 6, 1922.
2 SHEETS—SHEET 2.
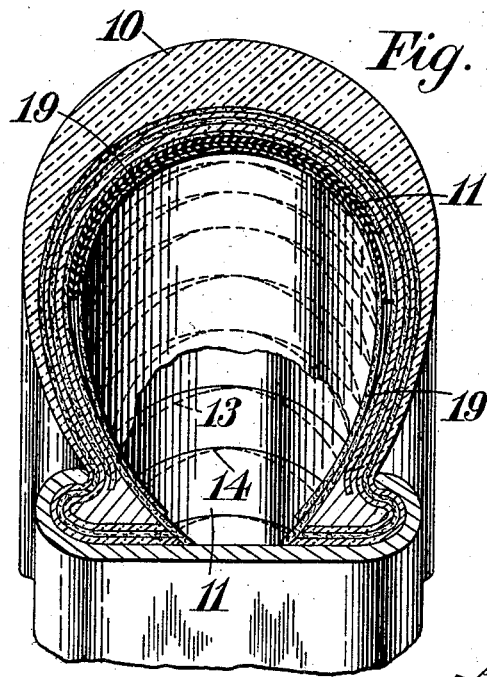
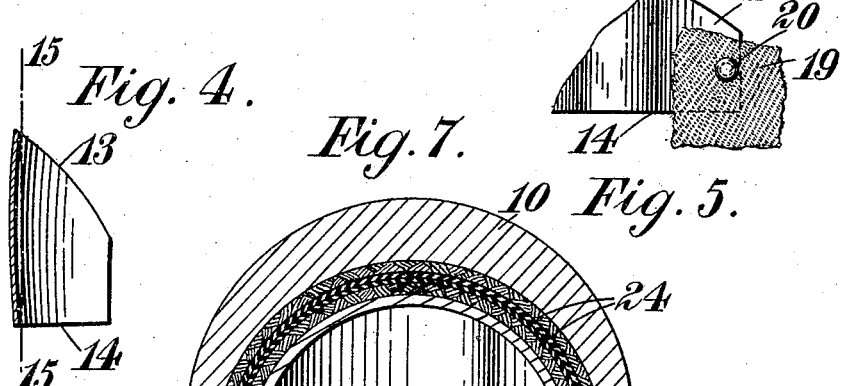
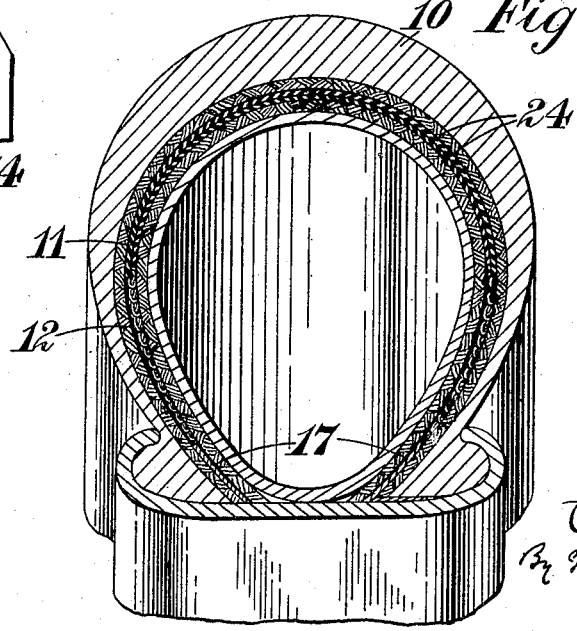

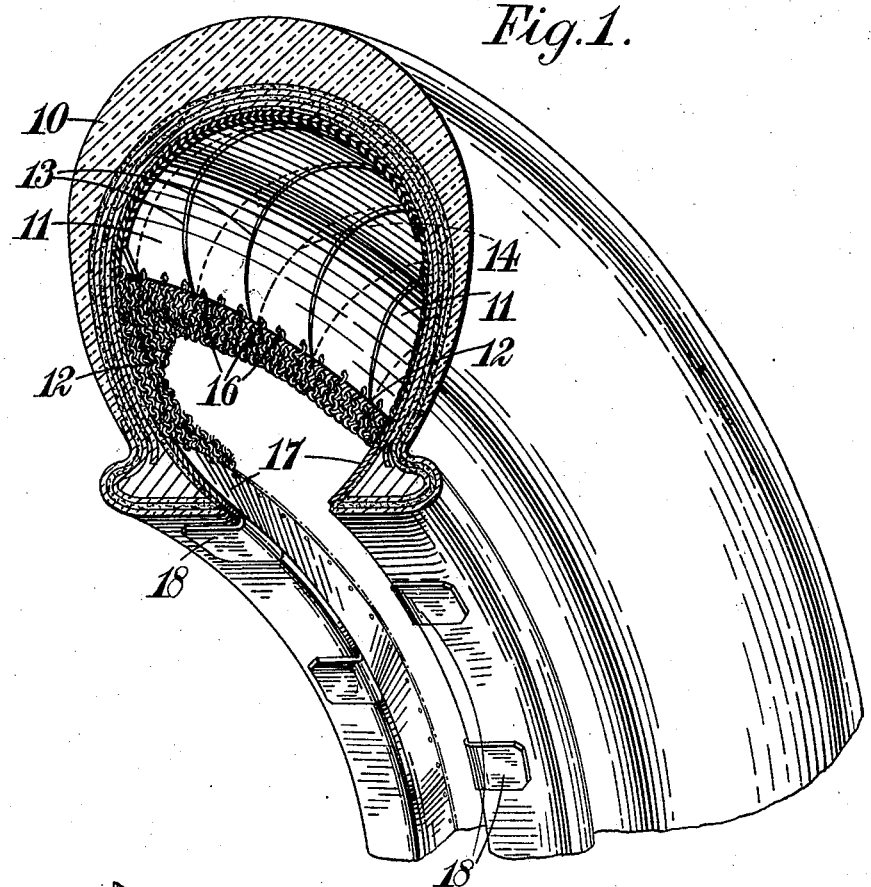
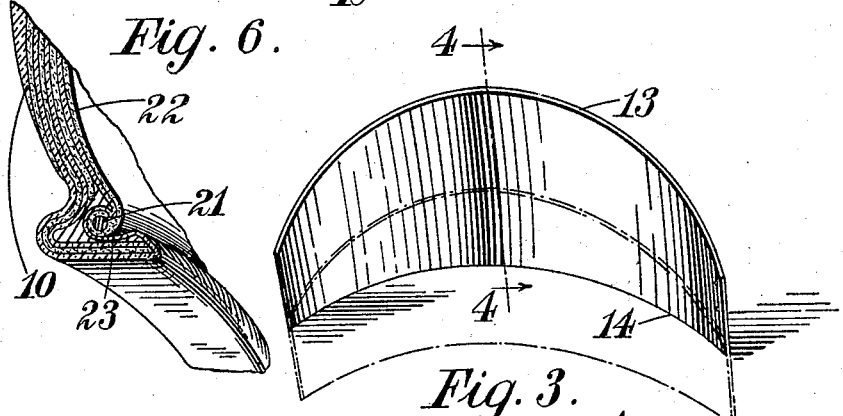

UNITED STATES PATENT OFFICE.

CHRISTOPHER H. HAMILTON, OF SOUTH DEVON, ENGLAND.

PNEUMATIC TIRE.

1,419,045.　　　　　Specification of Letters Patent.　　Patented June 6, 1922.

Application filed December 9, 1920. Serial No. 429,505.

*To all whom it may concern:*

Be it known that I, CHRISTOPHER HESKETH HAMILTON, subject of the King of England, residing at South Devon, England, have invented certain new and useful Improvements in Pneumatic Tires, of which the following is a specification.

This invention is for improvements in or relating to pneumatic tires, and has for one of its objects to provide a tire which shall be puncture proof, or as nearly so as is possible but which shall also retain its resilient qualities.

According to the primary feature of the present invention there is provided a flexible shield comprising a series of separate light metal or other puncture-resisting scales overlapping each other to form a ring open at the sides which is intended to extend around the inside of the tread of the tire, in combination with flexible securing means attached to each scale to maintain the scales in their correct relative relationship. The said securing means may take the form of a strip of flexible material, (for example fabric, rubbered if desired, or leather) attached to each scale and extending across the scales and beyond the side edges of the latter towards the base of the tire.

According to another feature of the invention a layer of soft material (for example asbestos cloth) may be provided between the shield and the outer cover of the tire and between the shield and the inner tube of the tire.

Other features of the invention relate to the attachment of the scales to their securing means, and to means for securing the flexible shield in place in a pneumatic tire.

Flexible shields according to the present invention may be applied to existing tires without any modification in the construction of the latter, but it is also a part of the present invention to provide complete pneumatic tires or tire covers which are so shaped as to be particularly adapted for retaining in position the said flexible shields.

For a more complete understanding of the invention there will now be described, by way of example only and with reference to the accompanying drawings, certain constructional forms of pneumatic tire and flexible shield according to the present invention. It is to be understood, however, that the invention is not limited to the precise constructional details set forth.

In these drawings:—

Figure 1 is a view partly in section of a pneumatic tire embodying a puncture-resisting shield according to the present invention. The inner tube of the tire is omitted in the illustration, and the form of shield shown is one which is particularly suitable for use on heavy vehicles;

Figure 2 is a somewhat similar view, of a modified construction shown in place on a wheel rim, and also with the inner tube of the tire omitted. Certain other parts are also shown partially broken away for the sake of clearness. This construction is particularly suitable for use on light vehicles.

Figure 3 is a perspective view of a puncture-resisting scale as used in the flexible shield.

Figure 4 is an elevation in section on the line 4—4 of Figure 3.

Figure 5 is a fragmentary elevation showing one method of attaching the scales to their flexible securing means.

Figure 6 is a fragmentary sectional view showing a method of securing a flexible shield in place in a tire cover, and Figure 7 is a sectional view showing layers of soft material between the shield and the outer cover and inner tube of the tire.

Like reference numerals indicate like parts throughout the drawings.

Referring to the construction illustrated in Figure 1, the outer cover 10 is of usual construction. Inside it is shown a flexible puncture-resisting shield consisting of a series of curved scales 11 and two strips 12 of metal chain mesh. The scales 11 are preferably made of thin hard spring steel. They are separate from each other and are arranged to overlap each other to form a ring open at the sides which will extend around the inside of the tread of the cover 10, which is, of course, the part of the tire most liable to be punctured. The arrangement of the scales is preferably that shown whereby at no point on the crown of the tread in said ring is there less than two thicknesses of the metal constituting the scales. Referring to Figures 3, 4 and 5 it will be seen therefrom that each scale has one curved edge 13 and one straight edge 14 opposite each other, and in the construction shown in Figure 1, the arrangement is such that the curved edge on each scale lies inside, i. e. towards the inner tube, of one adjacent scale, and the straight edge lies outside, i. e. towards the outer cover, of the other adjacent scale. The scales are bent, during manufacture, to a shape approximating as nearly as possible to the curvature of the tire, i. e. both its curvature circumferentially and transversely. Figure 3 illustrates the transverse curvature and Figure 4 the circumferential curvature. This latter curvature is relatively slight but will be apparent by comparison with the straight line 15—15 in Figure 4. Running along the sides of the ring of scales 11 are the strips 12 of metal chain mesh which are laced at 16 to each scale and thus maintain the latter in correct position. These strips 12, however, are flexible so that the scales are free to creep or move within limits relatively to each other and thus the resilience of the complete tire will not be interfered with. This is regarded as an important result of the employment of the puncture-resisting shield according to the present invention. The strips 12 extend from the scales 11 down along the sides of the tire cover towards the base. As these sides of the tire are sometimes punctured it is advantageous to make the strips 12 of metal chain mesh or some other puncture-resisting material. However, this is not essential as in some circumstances any desired flexible material may be employed to maintain the scales in their correct relative relationship. Furthermore, such flexible securing means need not necessarily lie along the edges of the scales 11 as illustrated. To assist in securing the shield properly in place in the tire, the strips 12 are shown as provided along their free edges with annular stiffening members 17 in the form of bands or rings of metal or other material. These members 17 serve to prevent the strips 12 from crumpling, and also provide a convenient means for being gripped at the point where the outer cover 10 is secured to the wheel rim. For this purpose the members 17 may be formed with extensions 18 to reach between the base of the tire and the wheel rim.

In the construction shown in Figure 2, the scales 11 are of the same general shape as those illustrated in Figure 1, but they are arranged in a different manner. In Figure 2 the curved edge 13 of each scale lies outside of the one adjacent scale and the straight edge 14 lies inside of the other adjacent scale. The securing means used in this construction takes the form of a single flexible strip 19 which is attached to each scale and extends across the scales and beyond the side edges of the latter towards the base of the tire. As will be seen, the strip 19 is arranged to lie inside of the ring of scales, i. e. on that face of the scales which is towards the inner tube of the tire.

As in Figure 1, the scales are each attached to the securing means independently of the other scales. In Figure 1 the attachment is by lacing. Riveting may, however, be employed. For example, in Figure 5 a scale 11 is shown attached to a securing strip such as 19 by a single rivet 20 at one side of the scale. There may be a similar rivet 20 at the other side of the scale also. The material constituting the strip 19 may be of fabric, rubbered if desired, or leather, or may be of any other suitable flexible material, and may be puncture-resisting or not according to circumstances. The strip may take the form of a continuous ring open at the sides, or the ends may be laced or otherwise attached together. The strip may be gripped by the beading of the tire or the inflation of the tire may be relied upon to maintain it and its attached scales in place; or the strip may be provided with stiffening and retaining members such as 17 and 18; or the construction illustrated in Figure 6 may be adopted. This construction, which is applicable to any form of flexible securing means, whether as illustrated in Figure 1 or Figure 2, or of some other form, consists of spring rings 21, say of metal wire, to which are secured the flexible securing means of the shield, such as a strip 22. Inwardly facing annular recesses or grooves 23 are provided in the interior of the outer cover 10 at each side and the aforesaid spring rings 21 are intended to be sprung into place in such recesses or grooves.

In the construction shown in Figure 2, there lies between the scales and the inner tube a strip of relatively soft material (namely the strip 19) which will prevent the scales chafing or otherwise damaging the inner tube. It is a feature of the present invention, however, to provide a layer of soft or relatively soft material between the scales or other parts of the shield and either the outer cover or the inner tube of the tire, or both, and one or two such strips may be employed in the construction shown in Figure 2 in a manner similar to that illustrated in Figure 7. The strips 24 lie one on each face of the flexible shield and since in some circumstances it may be advantageous that these strips, in addition to preventing chafing or other damage of the tire parts, should be heat insulating, a convenient material to employ is asbestos cloth. Obviously, however, other materials may be employed if desired.

It will be appreciated that by the employment of the flexible shield according to the present invention the whole or practically the whole of the inner tube will be more or less protected, the scales themselves protecting the most vulnerable part of the tire, namely the tread. Thus, especially if the flexible securing strips extend to the base of the tire and are of a puncture-resisting nature, damage to the inner tube will be almost impossible. This protection against damage is moreover given without impairing the resilience of the tire since the scales will bend and creep in correspondence with the movement of the tire and the flexible side strips will likewise accommodate themselves to the movement of the tire.

The invention is, of course, not limited to the precise constructional details hereinbefore described. For example, the scales may reach nearer to the base of the tire than is illustrated.

What I claim as my invention and desire to secure by Letters Patent is:—

1. A tire shield adapted for detachable insertion into and removal from a tire comprising in combination a series of separate metallic armor scales each curved to approximate to the circumferential and transverse curvature of the tire with which the shield is to be used, and one overlapping another to form a protective ring open at the sides, each of said scales extending entirely across the periphery of the ring, flexible securing means extending across the scales and beyond the side edges of the ring and arranged to lie on that face of the ring which will be toward the inner tube of the tire, and a plurality of rivets attaching each scale to said securing means independently of the other scales, only one rivet being provided at each side edge of each scale, for maintaining the scales in their correct relative relationship.

2. A tire shield adapted for detachable insertion into and removal from a tire comprising in combination a series of separate metallic armor scales each curved to approximate to the circumferential and transverse curvature of the tire with which the shield is to be used, and one overlapping another to form a protective ring open at the sides, each of said scales extending entirely across the periphery of the ring, flexible securing means extending across the scales and beyond the side edges of the ring and arranged to lie on that face of the ring which will be toward the inner tube of the tire, a plurality of rivets attaching each scale to said securing means independently of the other scales, only one rivet being provided at each side edge of each scale, for maintaining the scales in their correct relative relationship, and retaining members carried by the said securing means at the free edges thereof for engagement by the base of the tire.

3. The combination with a pneumatic tire comprising an inner tube and an outer cover surrounding the latter, of a tire shield readily detachably inserted between the said inner tube and outer cover, which shield comprises in combination a series of separate metallic armor scales, each curved to approximate to the circumferential and transverse curvature of the inner tube, and one overlapping another to form a protective ring open at the sides, each of said scales extending entirely across the periphery of the ring, flexible securing means extending across the scales and beyond the side edges of the ring and arranged to lie on that face of the ring which will be toward the inner tube of the tire, and a plurality of rivets attaching each scale to said securing means independently of the other scales, only one rivet being provided at each side edge of each scale, for maintaining the scales in their correct relative relationship.

In testimony whereof I affix my signature.

C. H. HAMILTON.